(12) United States Patent
Tashiro et al.

(10) Patent No.: US 6,494,288 B1
(45) Date of Patent: Dec. 17, 2002

(54) ACOUSTIC LOGGING TOOL

(75) Inventors: Hitoshi Tashiro, Kamakura (JP); Jahir Pabon, Brookfield, CT (US); Frank Morris, Missouri City, TX (US); Hitoshi Sugiyama, Sagamihara (JP); David Hoyle, Slependen (NO); David Leslie, Girton (GB); Kazumasa Kato, Yokohama (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/674,192
(22) PCT Filed: Apr. 28, 1998
(86) PCT No.: PCT/IB98/00646
§ 371 (c)(1), (2), (4) Date: Dec. 11, 2000
(87) PCT Pub. No.: WO99/56155
PCT Pub. Date: Nov. 4, 1999
(51) Int. Cl.⁷ .................................................. G01V 1/40
(52) U.S. Cl. ........................... 181/102; 181/106; 367/25

(58) Field of Search .................................. 181/102–106; 367/25, 86, 157, 159, 911; 166/250.01

(56) References Cited

U.S. PATENT DOCUMENTS

| | | | | |
|---|---|---|---|---|
| 3,191,141 A | * | 6/1965 | Schuster | 181/102 |
| 4,850,450 A | * | 7/1989 | Hoyle et al. | 181/102 |
| 5,043,952 A | * | 8/1991 | Hoyle et al. | 367/159 |
| 5,343,001 A | * | 8/1994 | Cowles | 118/102 |
| 5,387,767 A | * | 2/1995 | Aron et al. | 181/102 |
| 5,829,520 A | * | 11/1998 | Johnson | 166/250.01 |

* cited by examiner

*Primary Examiner*—Khanh Dang
(74) *Attorney, Agent, or Firm*—Robin Nava; Brigitte Jeffery; John Ryberg

(57) ABSTRACT

A sleeve for an acoustic logging tool having a structure with a window section having fewer bars than a conventional sleeve separated by a slotted region with thin circumferential slots which are stress-relieved at the ends ("dumb-bell" shaped). Steel receiver mounts are provided for hydrophone pressure sensors and this, together with the axially oriented hydrophones, makes the tool less susceptible to interfering vibration.

18 Claims, 5 Drawing Sheets

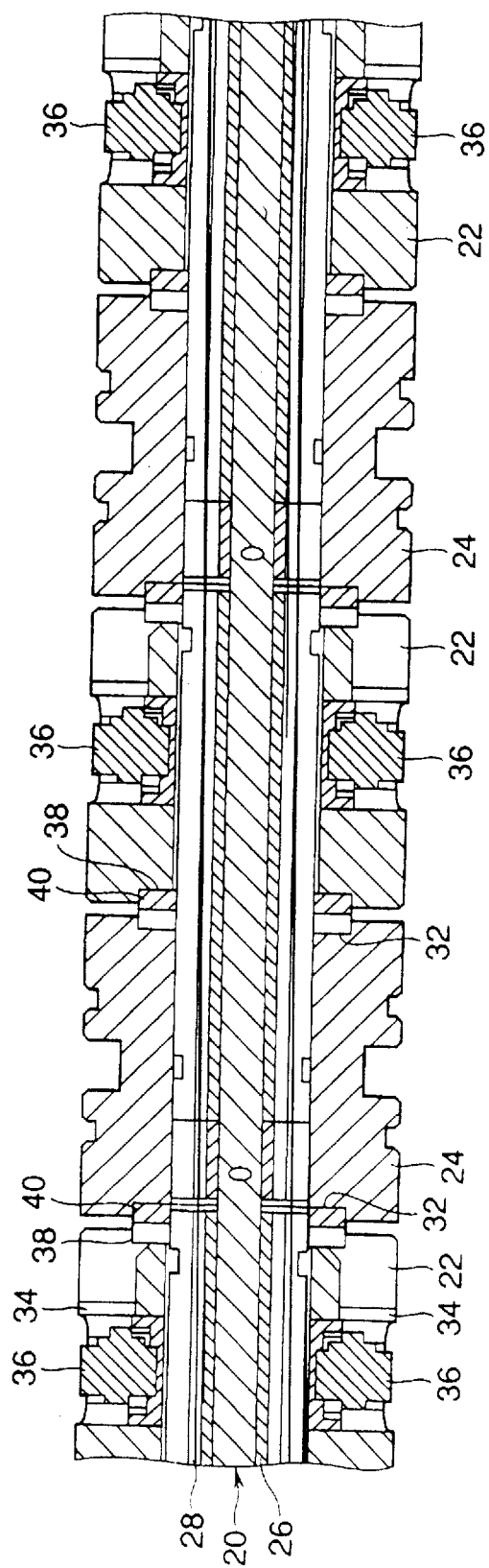
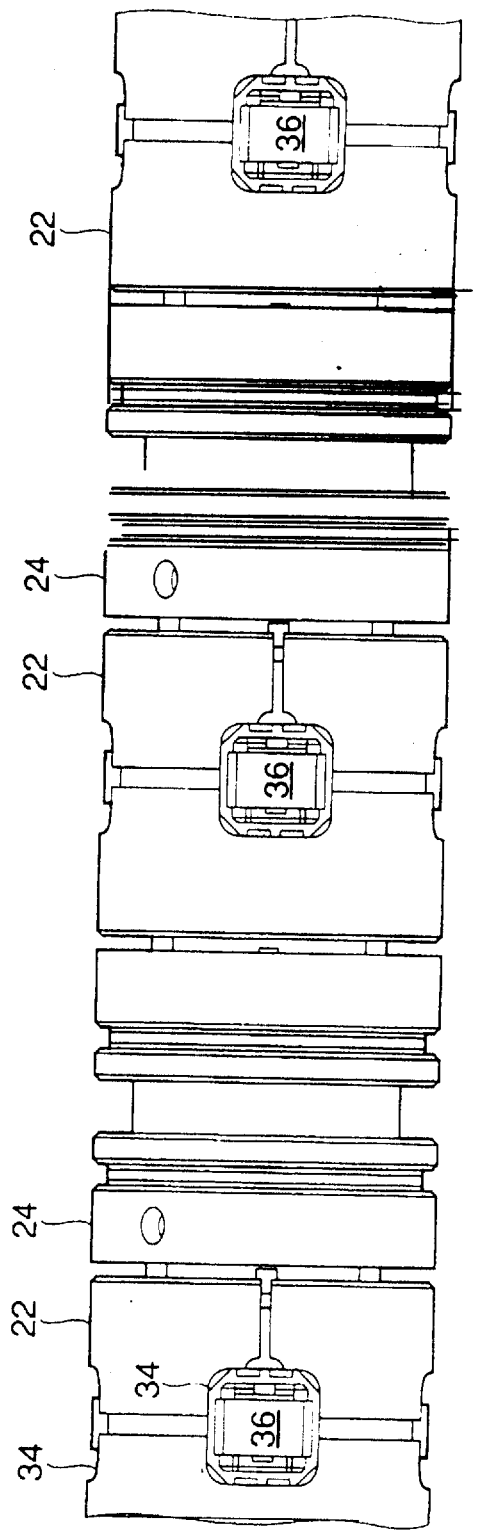
Fig.5a
Fig.5b

ACOUSTIC LOGGING TOOL

TECHNICAL FIELD

The present invention relates to acoustic logging tools, and in particular to aspects of a receiver section for an acoustic logging tool in which the interfering effect of flexural waves is minimised.

BACKGROUND ART

Acoustic logging tools are used in the evaluation of formations surrounding boreholes such as are used for extraction of hydrocarbons. FIG. 1 shows a schematic view of a prior art acoustic logging tool such as the DSI Dipole Sonic Shear Imager of Schlumberger. The tool comprises a sonde 10 which is lowered into a borehole 12 by means of a wireline cable 14. The cable is used both to support the sonde 10 and provide a power, control signal and data transmission path to the surface unit 16. The sonde 10 includes a transmitter section TX capable of generating dipole and monopole acoustic signals, a sonic isolation joint SIJ, a receiver section RX, and an electronics cartridge EC. The receiver section RX includes a number of spaced receiver stations, typically eight stations are used, and each station has typically four piezoelectric sensors for measuring pressure in the borehole due to passing acoustic waves. Examples of various aspects of such a tool can be found in U.S. Pat. No. 4,850,450; U.S. Pat. No. 4,862,991; U.S. Pat. No. 4,872,526; U.S. Pat. No. 5,036,945 and U.S. Pat. No. 5,043,952.

In dipole logging, the transmitter TX generates a dipole acoustic signal which propagates along a number of possible paths to the receivers $RX_1$, $RX_2$ (only two station are shown here instead of the usual eight for purposes of clarity). These paths which are shown schematically in FIG. 2, are (1) along the sonde itself, (2) through the fluid filling the borehole, and (3) as a formation/borehole mode in which the signal passes from the transmitter through the fluid in the borehole to the formations surrounding the borehole where a surface wave mode of the borehole is set up (this is a dispersive mode whose slowness dispersion characteristics are determined both by the properties of the formation surrounding the borehole, the dimensions of the borehole and the properties of the borehole fluid), then back into the borehole fluid and then to the receivers $RX_1$, $RX_2$. Since the purpose of acoustic logging is to determine the properties of the formation surrounding the borehole, it is the last path which is of interest, the signals passing along paths (1) and (2) giving no information about the formations and so interfering with the evaluation.

The speed (or "slowness") of propagation of the acoustic signal is dependent on the physical nature of the medium through which it propagates; typically the stiffer the medium, the faster the propagation. The slowness of the pressure field signal through the borehole fluid is typically around 200 µs/ft. The slowness of the tool flexural wave depends on the particular design of the tool but will typically be >700 µs/ft. The slowness of the formation/borehole flexural wave signal (the signal of interest) can range from about 100 µs/ft to 1000 µ/ft in typical formations logged by these tools. The presence of the sonic isolation joint SIJ between the transmitter TX and the receiver RX goes some way to reducing the signal propagated along the sonde body (the "tool signal"), an example of which is described in U.S. Pat. No. 4,862,991. However, this in itself is not enough, especially when dealing with the propagation of flexural waves along the tool. One approach is to provide a housing for the sonde which is configured to delay the tool signal sufficiently that it does not interfere with the formation signal. An example of this is found in U.S. Pat. No. 4,850,450 and in the Schlumberger DSI tool. The receiver section of the DSI tool includes a central mandrel around which are mounted alternate, Teflon hydrophone mounts and steel spacers connected together to form a continuous structure. The hydrophones are aligned radially (polarisation of the piezoelectric stack is aligned with the radius of the tool). The slotted sleeve has alternate window and slotted structures. The window section has 10 bars defining the windows (each window defining a 20° arc) and four rows of regular circumferential slots (each slot defining a 70° arc). The slotted sleeve is shown in FIGS. 3a and 3b.

Another approach is to avoid using a rigid continuous housing in the receiver section. U.S. Pat. No. 5,289,433, U.S. Pat. No. 5,343,001 and U.S. Pat. No. 5,731,550 describe acoustic tools in which the receiver includes receiver stations separated by connectors or spacers which include some compliant or acoustically isolating material at the contacting surfaces. The approach described in the '433 and 001 patents is that the receiver section lacks sufficient strength or rigidity to be used in tough logging conditions or non-vertical wells. In such conditions, a sleeve must be used and the problem of tool signal interference is found. The connectors in the '550 patent are configured to allow greater rigidity in compression but retain an element of sonic isolation in tension which is the normal logging condition.

While slotted sleeve tools do have good mechanical properties, certain problem can be encountered in slow formations, when sleeve arrivals in the interfere with the slow formation arrivals, and when inconsistencies arise in the waveforms from the receiver section due to tool vibration excited by borehole waves. It is an object of this invention to attempt to address such problems.

DISCLOSURE OF INVENTION

The present invention adopts certain principles to provide a structure which has a flexural dispersion (slowness vs. frequency) which does not overlap with the flexural dispersion of the borehole in the formations of interest, and in which the receiver section is constructed in a manner to optimise detection of the signal of interest while minimising the interfering signal and the sensitivity of the receiver section to coupling with the borehole mode of vibration.

In accordance with one aspect of the invention, a sleeve for surrounding the receiver section of an acoustic logging tool, at least in the region of the receiver stations, has alternating first and second apertured portions spaced along its length, wherein (a) the first apertured portion has elongate axial bar elements separated by windows in a circumferential arrangement, the windows being wider than the bars. and (b) the second apertured portion has rows of circumferentially elongate slots, the slots having a relatively narrow centre portion and relatively enlarged end portions.

In a second aspect of the invention, a receiver section for an acoustic logging tool comprises a number of receiver stations spaced along a tool body, each station including a number of polarised pressure sensors spaced around the circumference of the tool body, the axis of polarisation of the sensors being parallel to the axis of the tool body.

The first apertured portion of the sleeve (the window section) has a reduced number of bars of increased length and larger windows compared to a standard sleeve. This tends to reduce the spring constant/increase flexibility of this portion so increasing the flexural slowness of the sleeve (speed of flexural propagation along the sleeve). In one embodiment, two alternating window widths are chosen, for example alternating 45° and 25° windows. It is preferred to configure the window section so as to inhibit coupling with higher modes of vibration (such as hexapole). This is achieved by selecting the number of windows and the relative dimensions of the windows (for example, alternating sizes as described above).

The second apertured portion (the slotted section) portions are provided with typically three rows of thin circumferential slots with enlarged portions at the ends ("dumbbell" shaped slots). The axial length of the slotted section can be reduced while the mass is essentially the same as the corresponding structure in the prior art sleeve with regular slots. The ratio of the width of the centre portion of the slots to the radius of the end portions is typically at least 1:4, 1:6 being preferred. The slots typically define 70° arcs. Each row of slots is displaced relative to the adjacent row(s). This displacement is conveniently 90° although other angles might be appropriate.

In the receiver section, the pressure sensor (hydrophone) mounts are preferably made massive, constructed from steel. The hydrophones themselves are mounted axially (vertically) so as to be less susceptible to tool vibration caused by coupling of borehole modes. The receiver section has a central mandrel to which spacers are attached, each spacer carrying the weight of the receiver mount above through a compliant pad. Thus each receiver mount is essentially independent of its neighbours.

A basic concept which is used in constructing a tool embodying the present invention is to ensure that the flexural dispersion (slowness vs. frequency) of the tool does not overlap with the flexural dispersion of the formations of interest at the frequencies of interest. For example, where formations having a slowness of 1200 μs/ft are to be measured, the tool is designed such that tool flexural arrivals do not occur below that speed.

BEST MODE FOR CARRYING OUT THE INVENTION

A sleeve for an acoustic logging tool incorporating the present invention is shown in FIGS. 4a to 4e. The sleeve is formed from a steel cylinder with a number of openings or apertures cut into it by means of laser machining. The sleeve structure has two main parts, a first portion A having windows cut into the sleeve, and a second portion B defining a slotted section. This sleeve behaves conceptually as a spring-mass-spring-mass . . . system in flexural mode; the bars in the window sections A acting as the springs and the slotted sections B acting as the masses.

Figure 4A:
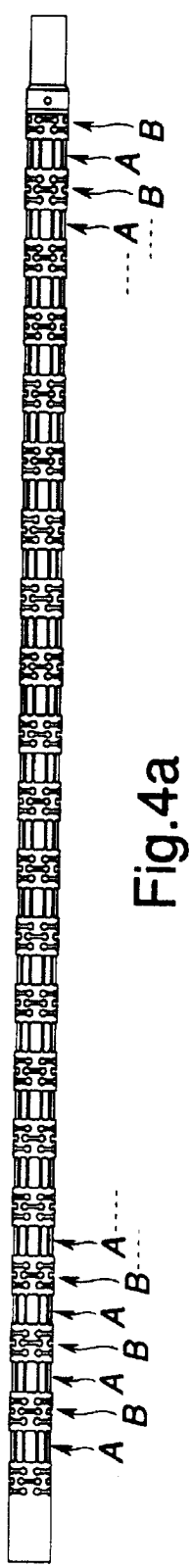
FIGS. 4a to 4e show general and detailed view of a sleeve according to one aspect of the invention FIGS. 5a an 5b show partial general and cross section views of a receiver section according to one aspect of the invention.
Figure 4B:
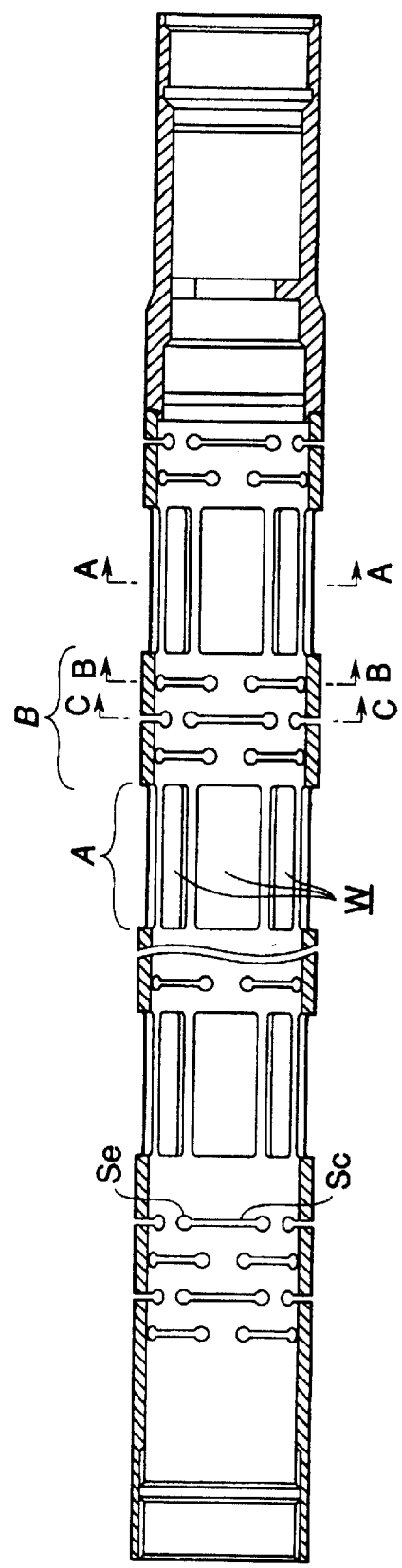
Figure 4C:
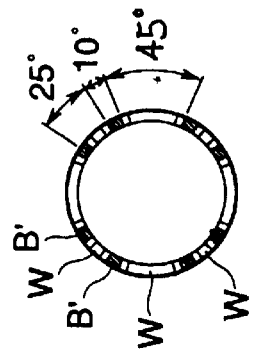
Figure 4D:
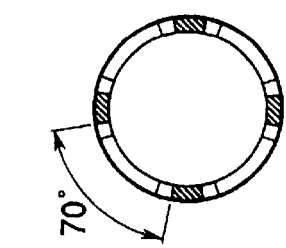
Figure 4E:
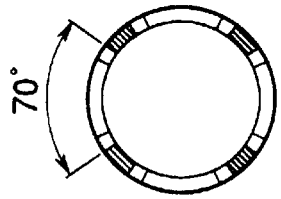

Each window portion A has eight rectangular windows W separated by bars B. In the embodiment of FIGS. 4a and 4b. Alternating sizes of windows (25" and 45") are used with regular (10") bars (see FIG. 4c (section on line AA of FIG. 4b)). These dimensions give suitably low spring constant for this section. The dimensions and number of bars/windows can be chosen to optimise this aspect of the sleeve's behaviour. In this particular case, the windows and bars are about 8 cm long. By selecting alternating window sizes and reducing the number of windows to eight, coupling of higher modes of vibration (such as hexapole) into the tool is inhibited. The particular dimensions and number of windows, and the symmetry of the window section can be varied to optimise this behaviour if required.

Figure 1:
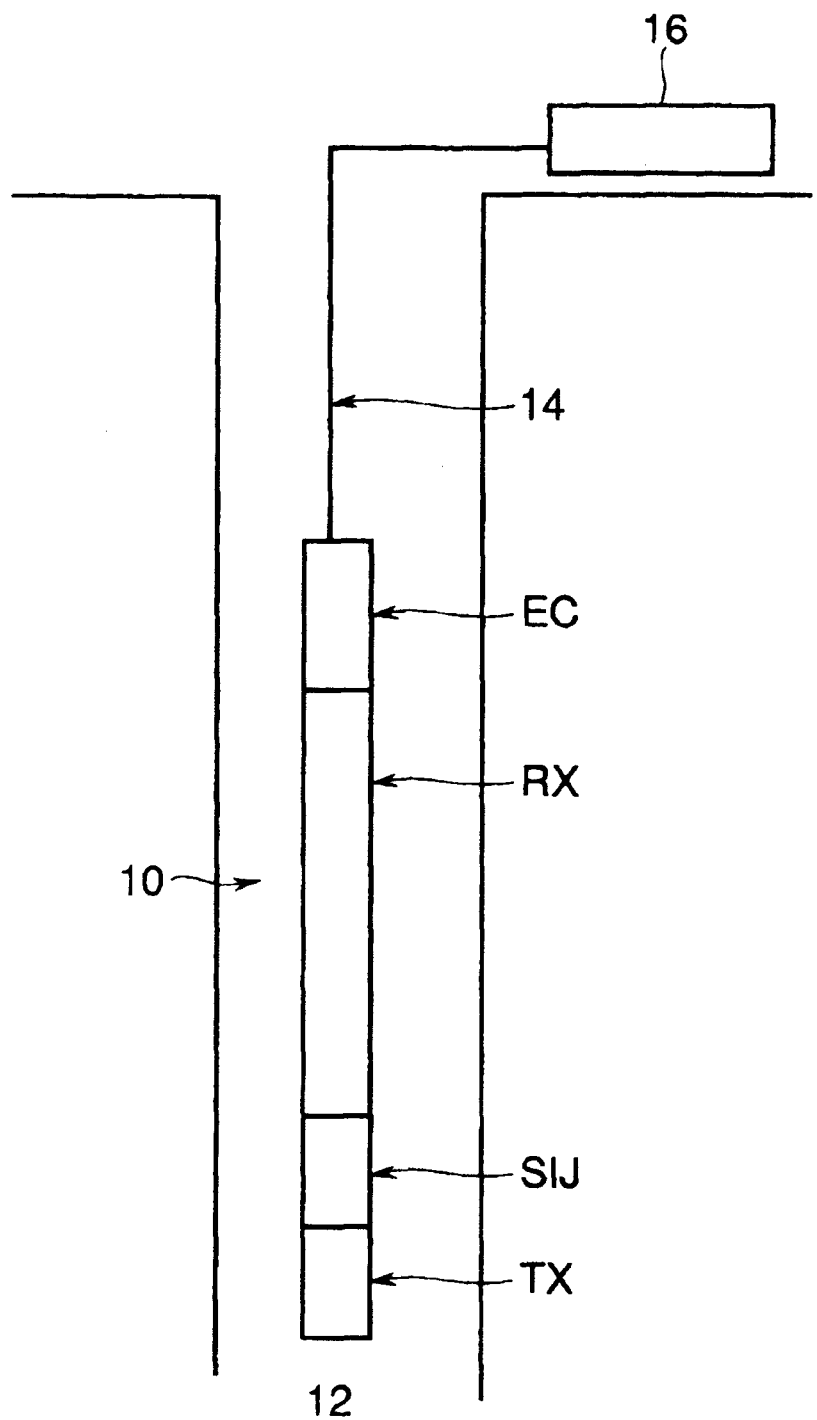
FIG. 1 shows a schematic view of a prior art acoustic logging tool.
Figure 2:
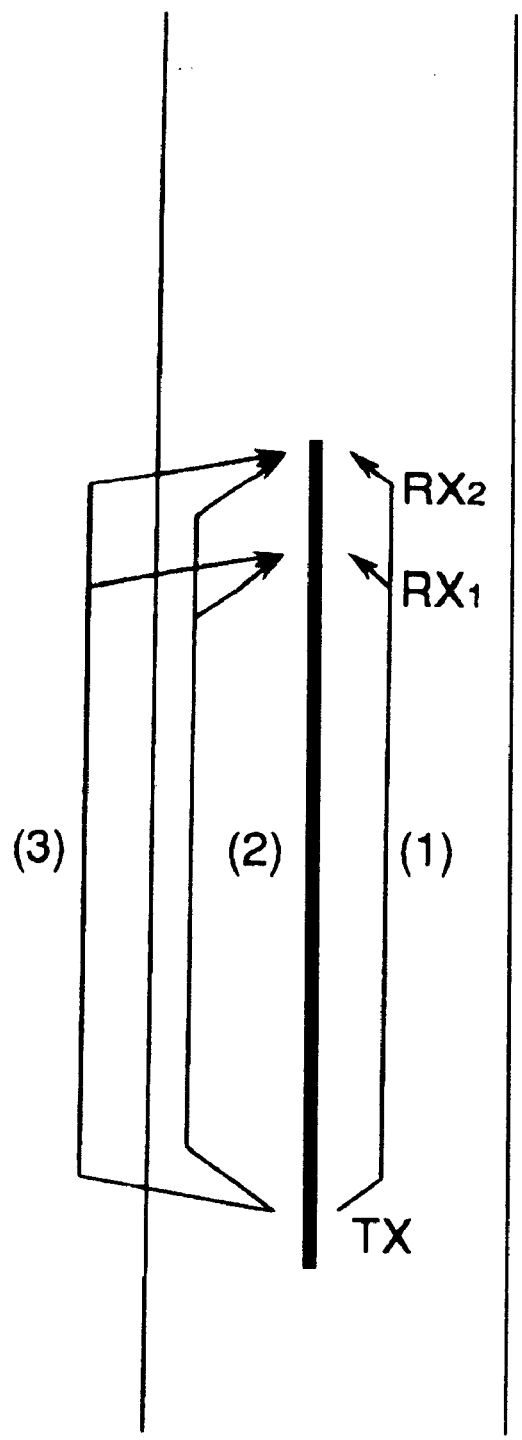
FIG. 2 shows the paths for dipole signals from an acoustic logging tool transmitter to receiver.
Figure 3A:
FIGS. 3a and 3b show general and partial cross section views of a prior art sleeve for use in an acoustic logging tool.
Figure 3B:
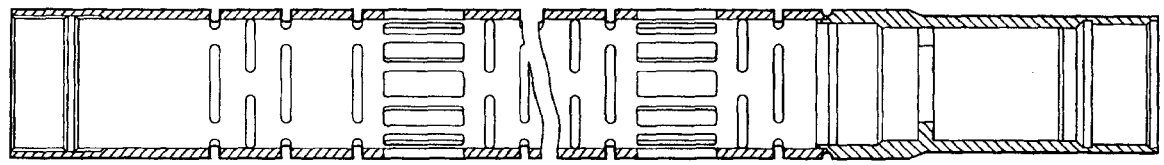

The simple slots in prior art sleeves (FIGS. 3a and 3b) are relatively easy to manufacture but suffer from stress concentration around the end portions. This impacts on the strength of the sleeve and places a limitation on the closeness of the spacing of the slots. Making the slots wider but keeping the same length would decrease the stress concentration but would also decrease the mass of the slotted section (i.e. the "mass" in the "mass-spring-mass . . . " system) and have a detrimental effect on the flexural behaviour. The sleeve shown in the FIGS. 4a to 4e uses "dumbbell" shaped slots, the narrow centre portions Sc give increased mass to the slotted portion B while the enlarged end portions Se of the slots act to relieve stress concentration. The end portions of the sleeve have 8 mm radius but could be enlarged to 12 mm without significant loss of strength in the sleeve; the central portion has a width of 2 mm. This is to be compared with the slots in the prior art sleeve which are about 6.4 mm wide. As a result of the smaller stress, the axial space between slots can be reduced, such that in the present case the slotted section is about 7.2 cm long. This results in a slower extensional mode.

Because of the slower extensional mode along the slotted section, the number of rows of slots can be reduced (from four to three) without sacrificing much compressional slowness. The shorter slotted section means a decreased mass but longer bars in the window section. The spring constant of the bars decrease is proportional to the third power of the length dimension (L') whereas the mass decrease is only proportional to the length dimensions itself (L). Thus the overall flexural slowness of the system will increase. The slots define 70° arcs on centres spaced 90° around the circumference of the sleeve. Each row is displaced from its neighbour(s) by 90° (see FIGS. 4d and 4e (sections on lines BB and CC of FIG. 4b respectively)). The ends of the sleeve have slotted sections with two and four rows of slots respectively.

A receiver section for use in an acoustic logging tool according to the invention is shown in FIGS. 5a and 5b. The section comprise a central mandrel 20 around which alternating receiver mounts 22 and spacers 24 are located. The mandrel 20 is formed from a central rod 26 having a Teflon sheath 28 in which are provided a number of grooves through which electrical wiring can be lead. The sheath provides a close fit with the receiver mounts or spacers so as to prevent radial movement. The spacers 24, which comprise massive steel bodies with a centralising ring around the outer circumference, are firmly connected to the central rod 26 by means of a locating screw (not shown) extending through the sheath 28. Square shaped recesses 32 are provided in the upper and lower ends of each spacer 24.

The receiver mounts 22 are also formed from steel and have four locating recesses 34 for hydrophone stacks 36 spaced around the outer circumference. Wiring from the hydrophones 36 is lead into the grooves in the sheath 28 and along the tool to an electronics cartridge. Square recesses 38 are provided in the ends of the receiver mounts 22, corresponding to the recesses 32 in the spacers 24. The receiver mounts 22 are not firmly connected to the mandrel 20 as are the spacers 24, but are free to slide along the mandrel 20. A resilient contact pad 40 is located between adjacent ends of a spacer 24 and a receiver mount 22. These pads 40 are the same shape and size as the recesses 32, 38 in the spacers 24 and receiver mounts 22. When the receiver is fully assembled, the spacers 24 are positioned such that there is sufficient space between consecutive spacers 24 for a receiver mount 22, leaving a small amount of room over. The receiver mounts 22 do not contact the spacers 24 directly but bear against the pads 40 which seat in the recesses 32, 38 of the spacer 24 and receiver mount 22. The pads 40 therefore serve not only to provide a resilient contact, but also to maintain the relative orientation of the receiver mounts 22 and spacers 24 (and by extension, the orientation between all of the receiver mounts 22 in the receiver section). Thus, when the receiver section is vertical, each receiver mount 22 is free to bear on the spacer 24 below through the pad 40.

The likelihood of the receiver section vibrating due to coupling of borehole flexural modes is reduced in two ways. First, the receiver mounts 22 are made of steel which means that it is more difficult for the borehole modes to cause the tool to vibrate (greater impedance mismatch). Second, the structure of the receiver section is constructed of alternate receiver mounts 22 and spacer sections 24. In the prior art tool, the receiver mounts and steel spacers are all connected together to make a single structure. In the present invention, each steel spacer 24 is firmly connected to the central mandrel 20 of the tool. The receiver mounts 22 are separated from the spacers 24 by compliant pads 40 which form the only connection. Thus each spacer 24 carries the mount 22 above it but does not bear on the mount 22 below. This structure prevents the receiver section from acting as a rigid body and from coupling with the borehole modes of vibration.

The piezoelectric receivers (hydrophones) in the present invention are aligned axially as opposed to radially in the prior art tool. The tool uses stacks of piezoelectric ceramic as pressure sensors. Given the intrinsic anisotropy of the polarised ceramic material and the non-negligible volume of the stack, the sensor can be expected to exhibit non-isotropic behaviour and have an output that changes depending on the orientation of the axis of polarisation of the stack in the presence of a non-uniform pressure/stress field. If a sensor stack of this type is attached to a vibrating rigid body, the vibration of the body it measures will depend upon the orientation of the stack axis and the direction of vibration. If the stack is polarised along the direction of vibration, its output will be maximal and in phase with the field induced by the vibration. If, on the contrary, the stack is polarised perpendicular to the direction of motion, the signal will be much smaller and will have the opposite phase.

This behaviour can be considered in the context of a body (tool) vibrating in the presence of a suddenly-applied, non-uniform pressure field. In such a case, the tool-induced field (the field induced by the body vibration) will initially have a phase opposite to that of the external field (if the tool remained perfectly rigid, the pressure build-up around it would be maximal, any initial movement caused by the external field will decrease the initial pressure build-up around the tool). For a stack attached to the body with its axis aligned with the direction of vibration, the stack output will contain a weighted subtraction of the two fields (the contribution of the output due to the body-induced field will be in phase with the body-induced field and therefore out of phase with the external field). In contrast, if the stack is polarised perpendicular to the direction of vibration, the output will initially contain a weighted addition of the two fields (the contribution of the body-induced field is out of phase with the body-induced field and therefore in phase with the external field). Consequently the initial response to an externally-applied field will be maximal when the stack is polarised perpendicular to the induced vibration of the body to which it is attached.

In the context of a dipole logging tool, waves (dipole compressional, flexural and shear?) propagating along the borehole will induce tool vibrations that are predominantly flexural in nature, i.e. the tool motion is predominantly perpendicular to the borehole/tool axis. Therefore, if piezo-stacks are used as receivers oriented along the borehole axis, there will be a double benefit. First, because the sensitivity of the stack output to any field induced by vibration of the tool is minimised, and second, because the initial response of the stack to the borehole waves will be maximal. Changing the mounting material and hydrophone orientation does affect the behaviour of the receivers somewhat but does not affect the tool's ability to make the measurements required.

The receiver section described here addresses the problem of tool vibration in two ways: by adopting a structure which it is more difficult for the borehole waves to excite into vibration; and by orienting the sensors to be less sensitive to any tool vibration which is excited by the borehole modes.

INDUSTRIAL APPLICABLITIY

The present invention finds application in the field of acoustic logging tools which can be used to evaluate the formations surrounding boreholes such as are drilled for the extraction of hydrocarbons or geothermal energy.

What is claimed is:

1. A sleeve for the receiver section for an acoustic logging tool, wherein said tool comprises a tool body with receiver stations, said sleeve being capable of surrounding the tool body in at least the region of the receiver stations and having alternating first and second apertured portions spaced along its length; the first apertured portion having elongate axial bar elements separated by windows in a circumferential arrangement, the windows being wider than the bars; and the second apertured portion having rows of circumferentially elongate slots, characterized in that each slot has a center portion and end portions, the center portion being narrower than the end portions and the end portions being enlarged compared to the center portion.

2. The sleeve of claim 1, wherein the slots of the second apertured portion have parallel sides in the center portion and approximately circular end portions.

3. The sleeve of claim 2, wherein the ratio of the width of the slot in the center portion to the radius of an end portion is at least 1:4.

4. The sleeve of claim 3, wherein the ratio is about 1:6.

5. The sleeve of claim 1, wherein each second apertured portion has three rows of slots.

6. The sleeve of claim 1, wherein each first apertured portion has eight windows.

7. The sleeve of claim 1, wherein the first apertured portion has windows of two alternating widths.

8. The sleeve of claim 7, wherein the windows have widths of 25° and 45° respectively.

9. The sleeve of claim 1, wherein said sleeve forms a part of an acoustic logging tool comprising a tool body with a transmitter section and a receiver section.

10. A sleeve for a receiver section for an acoustic logging tool comprising a tool body with receiver stations; said sleeve being capable of surrounding the tool body at least in the region of the receiver stations and having alternating first and second apertured portions spaced along its length; the first apertured portion having elongate axial bar elements separated by a plurality of windows of alternating widths, wherein said windows have widths ranging from 25° to 45°; and wherein each second apertured portion has a plurality of rows of slots, wherein said slots have parallel sides in the center portion and approximately circular end portions.

11. An acoustic logging tool comprising a tool body with a transmitter section and a receiver section, said receiver section comprising a number of receiver stations spaced along a tool body, each station including a number of polarized pressure sensors spaced along the circumference of the tool body, wherein the axis of polarization of the sensors is parallel to the axis of the tool body; and a sleeve surrounding the tool body at least in the region of the receiver stations and having alternating first and second apertured portions spaced along its length, the first apertured portion having elongate axial bar elements separated by windows in a circumferential arrangement, the windows being wider than the bars; and the second apertured portion having rows of circumferentially elongate slots, wherein each slot has a center portion and end portions, wherein said center portion of said slots is narrower than said end portions and said end portions is enlarged compared to the center portion.

12. The tool of claim 11, wherein said pressure sensors comprise piezoelectric stacks.

13. The tool of claim 11, wherein each station has four pressure sensors spaced equidistantly around the tool body.

14. The tool of claim 11, further comprising a central mandrel around with are mounted alternate, pressure sensor mounts and spacers, the spacers being firmly connected to the mandrel and the sensor mounts being held in position by the spacers.

15. The tool of claim 14, wherein said spacers and said pressure sensor mounts are made of steel.

16. The tool of claim 14, wherein each said pressure sensor mount contacts its neighboring spacers via resilient contact pads.

17. The tool of claim 14, wherein, when arranged vertically, the weight of each pressure sensor mount is carried by the spacer located below that mount.

18. A receiver section for an acoustic logging tool comprising a number of receiver stations spaced along a tool body, each station including a number of polarized pressure sensors spaced around the circumference of the tool body, characterized in that the axis of polarization of the sensors is parallel to the axis of the tool body, wherein said section further comprises a sleeve capable of surrounding the tool body at least in the region of the receiver stations and having an alternating first and second apertured portions spaced along its length, wherein (a) the first apertured portion has elongate axial bar elements separated by windows in a circumferential arrangement, the windows being wider than the bars, wherein said windows are of a plurality of alternating widths, and (b) the second apertured portion has a pluralty of rows of circumferentially elongate slots, each slot having a center portion and end portions, the center portion being narrower than the end portions, and the end portions being enlarged compared to the center portion, wherein the ratio of the width of the slot in the center portion to the radius of the end portion is at least 1:4.

* * * * *